Patented June 26, 1951

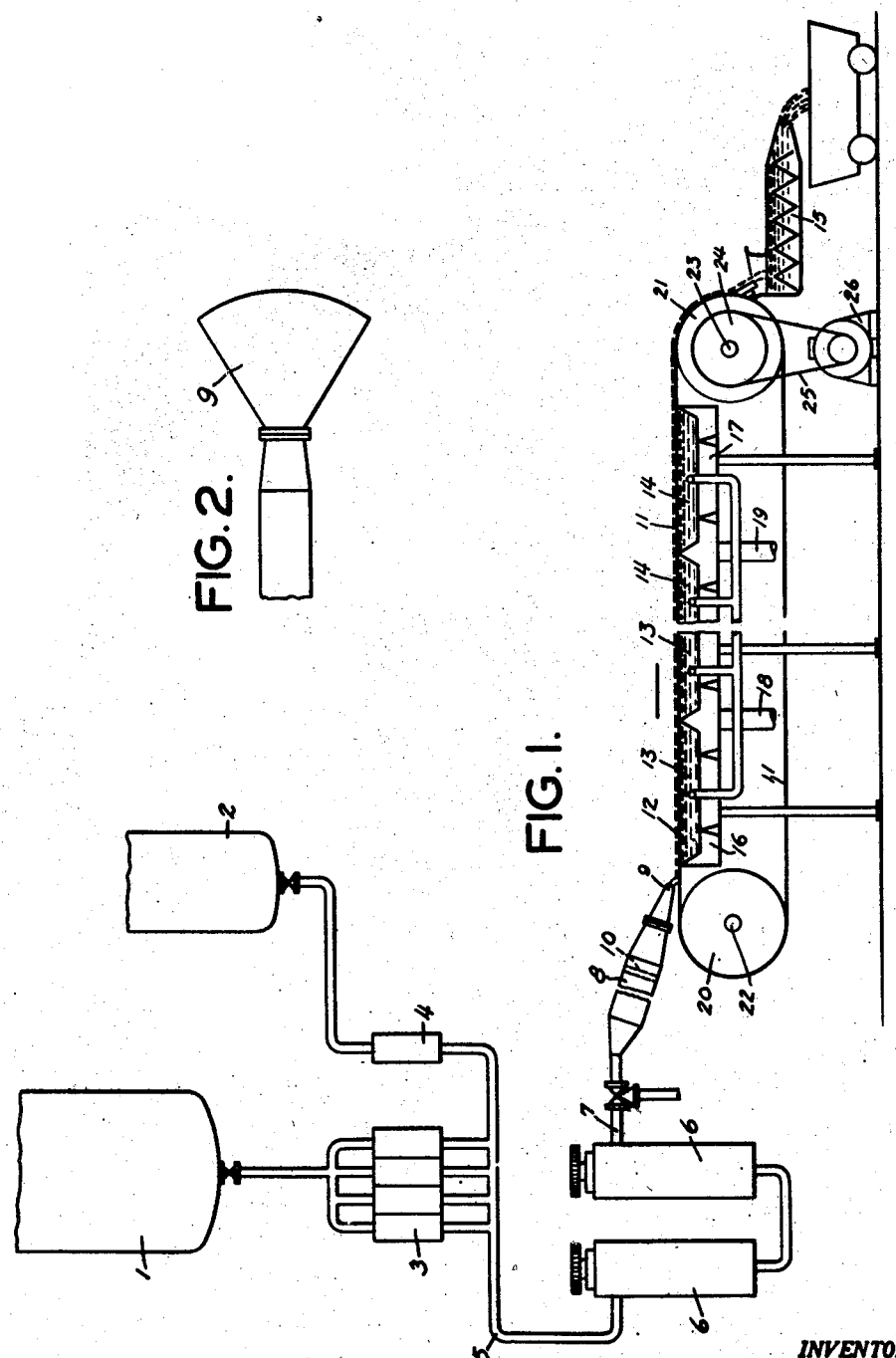

2,558,204

UNITED STATES PATENT OFFICE 2,558,204

PROCESS OF MANUFACTURING MARGARINE

Arthur Dacre Wilson, Hornchurch, and Henry Bowen Oakley, Bromborough, England, assignors to Lever Brothers Company, Cambridge, Mass., a corporation of Maine Application November 18, 1948, Serial No. 60,676
In Great Britain November 21, 1947

5 Claims. (Cl. 99—122)

This invention relates to the manufacture of margarine and more particularly to a process for improving plasticity characteristics of margarine.

In the past it has been common to manufacture margarine by a continuous process whereby liquid fat is continuously mixed with aqueous ingredients in the desired proportions and the mixture pumped through a chilling and emulsifying apparatus known as a Votator.

This type of apparatus is described in pages 702 to 708 of A. E. Bailey's book, "Industrial Oil and Fat Products" (Interscience Publishers Inc., New York, 1945). The Votator comprises one or more thin walled nickel tubes surrounded by a suitable low temperature cooling medium such as evaporating liquid ammonia. The tubes are provided with internal rotating blades which remove the thin film of chilled material from the wall of the tubes. After chilling, the mixture, which is nucleated with minute fat crystals, passes to a crystallizing unit where crystallization of the fat is allowed to take place.

Such a process, by itself, produces a product which is too hard for normal use and which tends to be inhomogeneous in texture. To make the texture of the product more uniform it is usual to include in the crystallizing unit one or more wire mesh screens through which the margarine passes. These screens serve to break up lumps and to submit the product to a certain amount of mechanical working which softens the material. However, it is usually found that the product, even after working has been applied to it, finally attains a hardness which is too high for table requirements. It is believed that softening by working of the margarine is largely a thixotropic effect and working by itself can only produce but little permanent change in the consistency.

It is an object of the present invention to provide a method of treating margarine produced by a continuous process of the kind described above, whereby a product of desirable consistency may be obtained.

It has now been found possible to impart a permanent improvement in softness and plasticity to margine produced by a continuous process of rapid chilling and emulsification of the margarine ingredients. The method of this invention comprises tempering the margarine by first warming it to a temperature between about 21° C. and 28° C., then cooling it to a temperature between about 10° C. and 20° C., and finally subjecting the cooled margarine to mild working.

It will be realized by those skilled in the art that it is not possible to give precise directions as to the most suitable temperatures at which the effect of the invention will manifest itself for all types of margarine.

The blend of the fat, that is the various fatty acids in the form of their triglycerides, will decide what are the most effective temperatures for each particular case, and these temperatures may readily be found by simple tests conducted in the light of the disclosure herein.

The lower limit of the cooling temperature will be governed in practice by the requirements of the succeeding working stage. The temperature must not be so low that the product is too hard to be worked easily. The upper limit of the cooling temperature is similarly governed by the margarine becoming too soft and showing a salvy texture due to overworking by the working device. Similar practical considerations apply to the choice of upper and lower limits for the temperature to which the margarine is warmed. Too low a temperature will necessitate a longer period at that temperature for the effect to become apparent. Too high a warming temperature will introduce difficulties in applying the heat uniformly throughout the mass without causing local overheating. Of course in no case should the margarine become melted, although a slight superficial melting is not harmful.

The temperature limits specified above are in accordance with these considerations. Generally it is found that very satisfactory results are obtained when the temperature to which the chilled solidified emulsion is warmed in the tempering step is about 23° to 25° C. and the temperature to which this warmed emulsion is cooled is about 14° to 17° C.

It is found that by the method of the invention a margarine, which before treatment is too hard for packing or for table use, may be given a permanent increase in softness and plasticity, the product being easier to cut and spread than before treatment.

For a more complete description of the invention reference may be had to the accompanying drawing in which:

Figure 1 is a diagrammatic representation of a complete system for processing margarine; and Figure 2 is a plan view of a portion of Figure 1

Referring to Figure 1, liquid fat from supply tank 1 and aqueous ingredients from supply tank 2 are fed by pumping devices 3 and 4 through a conduit 5. The pumping devices 3 and 4 preferably are such as to supply the materials from tanks 1 and 2 in the required proportions automatically.

The material passes along the conduit 5 to a Votator 6 in which the ingredients to be mixed, emulsified and chilled are passed through thin walled nickel tubes surrounded by a cooling medium of evaporating liquid ammonia. The tubes are provided with internal rotating blades which remove the thin film of chilled material from the wall of the tubes. In this way the oil and milk are rapidly mixed and chilled. The details of construction of such a Votator are well known and form no part of the present invention. The chilled mixture passes from the Votator 6 through conduit 7 into a crystallizing unit 8 fitted with screens 10. From this unit in which margarine sets it is extruded through a fan shaped nozzle 9.

The nozzle 9 is located directly above an endless steel band 11, which is moved in the direction of the arrow. A plan view of the nozzle is shown in Figure 2.

The steel band 11 passes around pulleys 20 and 21 which are mounted on horizontal shafts 22 and 23, respectively. Also mounted on shaft 23 is a pulley 24 which is driven by a belt 25 actuated by a driving means such as motor 26.

The extruded material drops on to the band 11 in the form of a ribbon 12. The band 11 moves over the surface of warm water passed continuously through trays 13 and then over the surface of cold water passed continuously through a second series of trays 14.

The water overflows the tops of these trays into overflow troughs 16 and 17 respectively, and outlet pipes 18 and 19 recirculate the water through the heater or cooler as the case may be.

In one preferred embodiment, for example, the length and speed of the band 11 is such that it is possible to warm the ribbon to 24° C. by passage over trays 13 and cool it to 15° C .by passage over trays 14. The band 11 discharges the cooled ribbon of margarine into a mechanical working device 15, such as a worm-extruder device of any well known type, wherein the margarine can be subjected to gentle working. After working and resting for a suitable period, a margarine is produced which is easy to cut and spread.

The following is a working example to illustrate the operation of the above described arrangement:

The working conditions of the Votator 6 were adjusted so that the ribbon 12 of margarine emerged from the nozzle 9 at 17° C. The thickness of ribbon from this nozzle was $\frac{3}{16}$ inches and the width 22 inches. Warm water at 29° C. and cold water at 3° C. were passed through trays 13 and 14, respectively. The output rate of margarine was 1 ton per hour, the speed of movement of the band, which was 2 ft. wide, was 24 ft. per minute. To allow five minutes warming time and two minutes cooling time, 168 ft. of band were required, five-sevenths of this distance being over the warming trays 13 and two-sevenths over the cooling trays 14.

In the arrangement described it is necessary to ensure that the ribbon 12 of margarine is thin enough to undergo rapid temperature changes when passing over the warm and cool trays 13 and 14. A ribbon formed by a nozzle with ¼ inch aperture under similar conditions to those described in the example above takes 9 and 3 minutes to acquire the temperature 24° C. and 15° C., respectively. Thus if a nozzle with a ½ inch aperture were used the increased time due to increased ribbon thickness would necessitate the use of a lower speed of movement of band 11 with a corresponding decrease in output or alternatively an increased length of band.

Additional aids for heating the margarine ribbon on the band 11 may be used thereby enabling a shorter band to be used. For example, the band may be passed through a hot sterilized air chamber arranged to warm the top surface. Alternatively, electric, steam, hot air or gas radiators may be used either for warming the upper surface of the ribbon directly by radiant heat or as a means of heating sterilized air in the above mentioned chamber through which the band passes, or both. Heating by means of radiofrequency radiations may also be used.

It has also been found that the crystallising unit 8 may be omitted, and the nozzle 9 connected directly to the conduit 7. Preferably under such conditions deep chilling is employed in the Votator 6, and the ribbon emerging from the nozzle is made as thin as possible. Preferably also the nozzle 9 is jacketed with warm water to facilitate the flow of the margarine therethrough.

It should be understod that various alternative arrangements are possible for tempering margarine formed by the continuous process described above. For example, the margarine emerging from the crystallizing unit 8, instead of being warmed and cooled on the steel belt 11, may be conducted to a battery of tubes which are alternatively heated and cooled by externally circulated warm and cold water. All the tubes in one such battery are filled individually with margarine in rapid succession by means of a mechanical distributor valve. After being tempered by the passage of warm and cold water in succession around the tubes, the margarine is forced out of the battery into any suitable working device such as a wide pipe fitted with wire mesh screens.

It should be further understood that the means described for alternately heating and cooling the margarine are only illustrative and should not be taken as limiting the scope of the invention as defined in the following claims.

We claim:

1. A process for permanently improving the plasticity of margarine, comprising first heating said margarine, then cooling said margarine and finally subjecting said margarine to mechanical working.

2. A process for treating margarine made by a continuous process of chilling and emulsification, said treating process comprising first heating said margarine, then cooling said margarine and finally subjecting said margarine to mechanical working.

3. A process for treating margarine made by a continuous process of chilling and emulsification, said treating process comprising first heating said margarine to a temperature between 21° C. and 28° C., then cooling said margarine to a temperature between 10° C. and 20° C. and finally subjecting said margarine to mechanical working.

4. A process for treating margarine made by a continuous process of chilling and emulsification, comprising passing said margarine first over heating means, then over cooling means and finally subjecting said margarine to mechanical working.

5. A process for treating margarine which comprises first passing said margarine over means for heating it to between 21° C. and 28° C., passing said margarine over means for cooling it to between 10° C. and 20° C. and finally subjecting said margarine to mechanical working.

ARTHUR DACRE WILSON.
HENRY BOWEN OAKLEY.

REFERENCES CITED

The following references are of record in the file of this patent:

UNITED STATES PATENTS

| Number | Name | Date |
|---|---|---|
| Re. 19,767 | Reynolds | Nov. 26, 1935 |
| 1,707,800 | Epstein | Apr. 2, 1929 |
| 2,206,419 | De H. Miller | July 2, 1940 |